(12) United States Patent
Sperando et al.

(10) Patent No.: US 10,625,601 B2
(45) Date of Patent: Apr. 21, 2020

(54) IMPROPER FUEL NOZZLE INSERTION-INHIBITING ASSEMBLY

(71) Applicant: ILLINOIS TOOL WORKS INC., Glenview, IL (US)

(72) Inventors: Stephen M. Sperando, Glen Ellyn, IL (US); Paul M. Sutenbach, Highland Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 291 days.

(21) Appl. No.: 14/769,485

(22) PCT Filed: Feb. 17, 2014

(86) PCT No.: PCT/US2014/016733
§ 371 (c)(1),
(2) Date: Aug. 21, 2015

(87) PCT Pub. No.: WO2014/133813
PCT Pub. Date: Sep. 4, 2014

(65) Prior Publication Data
US 2016/0009173 A1    Jan. 14, 2016

Related U.S. Application Data

(60) Provisional application No. 61/770,112, filed on Feb. 27, 2013.

(51) Int. Cl.
*B60K 15/01* (2006.01)
*B60K 15/04* (2006.01)
(Continued)

(52) U.S. Cl.
CPC ............. *B60K 15/04* (2013.01); *B60K 15/05* (2013.01); *B60K 2015/03296* (2013.01); *B60K 2015/0483* (2013.01); *B60K 2015/053* (2013.01)

(58) Field of Classification Search
CPC .................. B60K 15/04; B60K 15/05; B60K 2015/03296; B60K 2015/0483; B60K 2015/053; B60K 2015/049
(Continued)

(56) References Cited

U.S. PATENT DOCUMENTS 7,096,899 B2 *  8/2006  Vetter ................ B60K 15/0406
                                                    141/348
7,293,586 B2 * 11/2007  Groom .................. B60K 15/04
                                                    141/301
(Continued)

FOREIGN PATENT DOCUMENTS

CN         101003256        7/2007
CN         101823427 A      9/2010
(Continued)

OTHER PUBLICATIONS

ISR and WO for PCT/US2014/016733 dated Apr. 25, 2014.

*Primary Examiner* — J. Gregory Pickett
*Assistant Examiner* — Niki M Eloshway
(74) *Attorney, Agent, or Firm* — Quarles & Brady LLP

(57) ABSTRACT

An improper fuel nozzle insertion-inhibiting assembly is configured to prevent an improper fuel-dispensing device from dispensing fuel into a fuel fill line of a vehicle. The assembly may include a cover including an open cavity defined by a circumferential wall and a front face wall, and a main body defining an internal chamber. At least one barrier door may be pivotally secured to the main body. The barrier door(s) is configured to close a nozzle-receiving channel that extends through the internal chamber. The barrier door(s) may include an integral pivot axle that is pivotally secured to an axle bearing within the main body. The barrier door(s) is configured to be pivoted open by inward urging of a proper or compatible fuel nozzle.

20 Claims, 7 Drawing Sheets

(51) Int. Cl.
*B60K 15/05* (2006.01)
*B60K 15/00* (2006.01)
*B60K 15/03* (2006.01)

(58) Field of Classification Search
USPC ............... 220/86.2, 831, 832, 830
See application file for complete search history.

(56) References Cited

U.S. PATENT DOCUMENTS

| | | | |
|---|---|---|---|
| 7,549,443 B2 | 6/2009 | Levey et al. | |
| 7,950,425 B2 | 5/2011 | Och | |
| 8,899,285 B2 * | 12/2014 | Hagano | B60K 15/04 |
| | | | 141/350 |
| 9,102,230 B2 | 8/2015 | Hagano et al. | |
| 2006/0032549 A1 | 2/2006 | McClung et al. | |
| 2006/0096662 A1 | 5/2006 | King et al. | |
| 2006/0289084 A1 | 12/2006 | Groom et al. | |
| 2007/0000574 A1 | 1/2007 | Decapua et al. | |
| 2008/0237230 A1 | 10/2008 | Och | |
| 2010/0218849 A1 | 9/2010 | Hagano | |
| 2011/0108563 A1 | 5/2011 | Gerdes | |
| 2011/0139779 A1 * | 6/2011 | Muller | B60K 15/0406 |
| | | | 220/86.2 |
| 2011/0214783 A1 | 9/2011 | Ichimaru et al. | |
| 2012/0211489 A1 * | 8/2012 | Walser | B60K 15/04 |
| | | | 220/86.2 |
| 2015/0048087 A1 * | 2/2015 | Hagano | B60K 15/04 |
| | | | 220/86.2 |
| 2015/0191080 A1 * | 7/2015 | Beck | B60K 15/04 |
| | | | 141/350 |

FOREIGN PATENT DOCUMENTS

| | | |
|---|---|---|
| CN | 102131669 A | 7/2011 |
| CN | 202029692 U | 11/2011 |
| DE | 3641274 A1 | 6/1987 |
| EP | 1690727 A2 | 8/2006 |
| FR | 2753138 A1 | 3/1998 |
| WO | 2005077698 A1 | 8/2005 |
| WO | 2009135954 A2 | 11/2009 |
| WO | 2010021829 A1 | 2/2010 |
| WO | 2010104661 A1 | 9/2010 |
| WO | 2011053563 A1 | 5/2011 |

* cited by examiner

IMPROPER FUEL NOZZLE INSERTION-INHIBITING ASSEMBLY

RELATED APPLICATIONS

This application is a National Phase of PCT/US2014/016733 filed Feb. 17, 2014 and relates to and claims priority benefits from U.S. Provisional Patent Application No. 61/770,112 filed Feb. 27, 2013, which is hereby incorporated by reference in its entirety.

FIELD OF THE DISCLOSURE

Embodiments of the present disclosure generally relate to fuel nozzle receiving systems of vehicles, and more particularly, to fuel nozzle receiving systems that are configured to inhibit improper or incompatible fuel nozzles from dispensing fuel into a fuel tank.

BACKGROUND OF THE DISCLOSURE

Various vehicles, such as automobiles, are powered by gasoline, diesel fuel, or the like. As such, the vehicles typically include fuel systems having a tank configured to retain fuel, such as gasoline or diesel fuel, and a fuel fill pipe that serves as an inlet for supplying fuel to the tank from a fuel nozzle of a refueling station. In general, a fuel fill pipe includes an opening that may be exposed during refueling to receive the nozzle. An exposed end portion of the fuel pipe is of sufficient size to receive a discharge tube of a refueling nozzle. The nozzle typically fits relatively loosely in the fuel fill pipe so that the nozzle may be quickly and easily inserted and removed from the fuel fill pipe.

Many passenger and commercial vehicles are powered through diesel fuel. The automotive industry continues to produce diesel powered vehicles at an increasing rate. Refueling stations provide diesel fuel for customers. Indeed, in Europe, nearly 50% of all passenger vehicles are powered by diesel fuel.

However, many diesel powered vehicles are susceptible to being mis-fueled (for example, mistakenly fueled) with gasoline. Gasoline nozzles typically are smaller than diesel nozzles and may be inserted into a refueling orifice of a diesel powered vehicle. Conversely, the larger size of a diesel nozzle typically prevents it from being inserted into the smaller refueling orifice of a gasoline powered vehicle.

Accordingly, various fuel systems include a mis-fuel inhibitor (MFI). An MFI is a device configured to prevent a gasoline nozzle from being inserted into a diesel fuel tank, or vice versa. For example, one type of MFI includes an inlet having an opening that prevents mis-fueling by nozzles having a diameter that exceeds that of the opening. As an example, the MR may include top and bottom doors. While an improper nozzle may be inserted past the top door, the nozzle generally is unable to engage the bottom door as the diameter of the nozzle is too large to pass through a passage proximate to the bottom door. Another type of MFI includes a locking bottom door that only allows a complimentary nozzle to fit therethrough. Additional MFI systems are disclosed in WO 2005/077698, WO 2010/021829, WO 2011/053563, U.S. Pat. Nos. 7,950,425, 7,549,443, and FR 2 753 138, for example.

As fuel efficiency standards are promulgated, many manufacturers seek to minimize sizes and weights of certain components of vehicles, in order to reduce the overall weight of the vehicle. Also, additional components may be secured within spaces of vehicles, such as vehicle frames. MFIs mounted within a nozzle-receiving assembly are also becoming smaller. Smaller MFIs are needed that will accommodate larger nozzles in reduced volumes and spaces within the vehicles.

In a typical MFI device, a pin extends through an outer wall of a main inlet cover or body. For example, through-holes are formed through the inlet cover to accommodate and secure the pin to the inlet cover. A seal may be positioned above the pin, which typically requires additional space within the vehicle. However, the pin is typically a separate and distinct component that needs to be secured to the cover or body and a door within the cover. Accordingly, the pin occupies space within the assembly, thereby adding size and weight to the assembly. Further, the process of connecting the pin to the cover or body and securing the door to the pin increases the time and cost of manufacturing the MFI.

SUMMARY OF THE DISCLOSURE

Certain embodiments of the present disclosure provide an improper fuel nozzle insertion-inhibiting assembly that is configured to prevent an improper fuel-dispensing device from dispensing fuel into a fuel fill line of a vehicle. The assembly may include a cover including an open cavity defined by a circumferential wall and a front face wall, and a main body defining an internal chamber. At least one bather door may be pivotally secured to the main body. The barrier door(s) is configured to close a nozzle-receiving channel that extends through the internal chamber. The barrier door(s) may include an integral pivot axle that is pivotally secured to an axle bearing within the main body. The bather door(s) is configured to be pivoted open by inward urging of a proper fuel nozzle.

The assembly may be devoid of a separate and distinct pin or fastener that connects the bather door(s) to the main body. The cover may be devoid of one or more through through-holes configured to retain at least a portion of a separate and distinct pivot pin.

The barrier door(s) may include a covering panel integrally formed with a hinge that extends rearwardly and upwardly from the covering panel. The pivot axle may extend from the hinge. For example, in at least one embodiment, the pivot axle may include first and second opposed posts laterally extending from first and second sides, respectively, of an upper portion of the hinge.

In at least one embodiment, the barrier door(s) may include a nozzle inlet barrier door and a nozzle outlet barrier door. The nozzle inlet barrier door may be positioned proximate to the front face wall. For example, the nozzle inlet barrier door may be pivotally secured over an opening formed in the front face wall that forms an inlet of the nozzle-receiving channel. The nozzle outlet bather door may be positioned downstream from the inlet barrier door within the internal chamber.

The assembly may also include at least one restricting member within the internal chamber. The restricting member(s) is configured prevent a fuel nozzle of the improper fuel-dispensing device from passing further into the internal chamber. In at least one embodiment, the restrictingj member(s) may include at least one rib having a leading end that is shorter than a trailing end.

The assembly may also include at least one pressure relief valve operatively connected to the at least one barrier door. The assembly may also include at least one torsion spring operatively connected to the barrier door(s). The torsion spring(s) biases the barrier door(s) into a closed position.

The assembly may also include a nozzle-latching member radially and inwardly extending from the circumferential wall. The nozzle-latching member may be outside of the internal chamber. The nozzle-latching member is configured to securely engage a portion of a proper fuel nozzle.

In at least one embodiment, the barrier door(s) may include a locking feature that prevents a fuel nozzle of the improper fuel-dispensing device from opening the bather door(s). As one example, the locking feature may be an opening formed through the barrier door(s) that is able to receive and retain a distal end of an improper fuel nozzle.

In at least one embodiment, at least one barrier door may be located within the internal chamber. For example, a nozzle outlet barrier door may be disposed within the internal chamber, while a nozzle inlet barrier door is upstream from the nozzle outlet barrier door, and may close an inlet of the nozzle-receiving channel formed through the front face wall.

Figure 1:
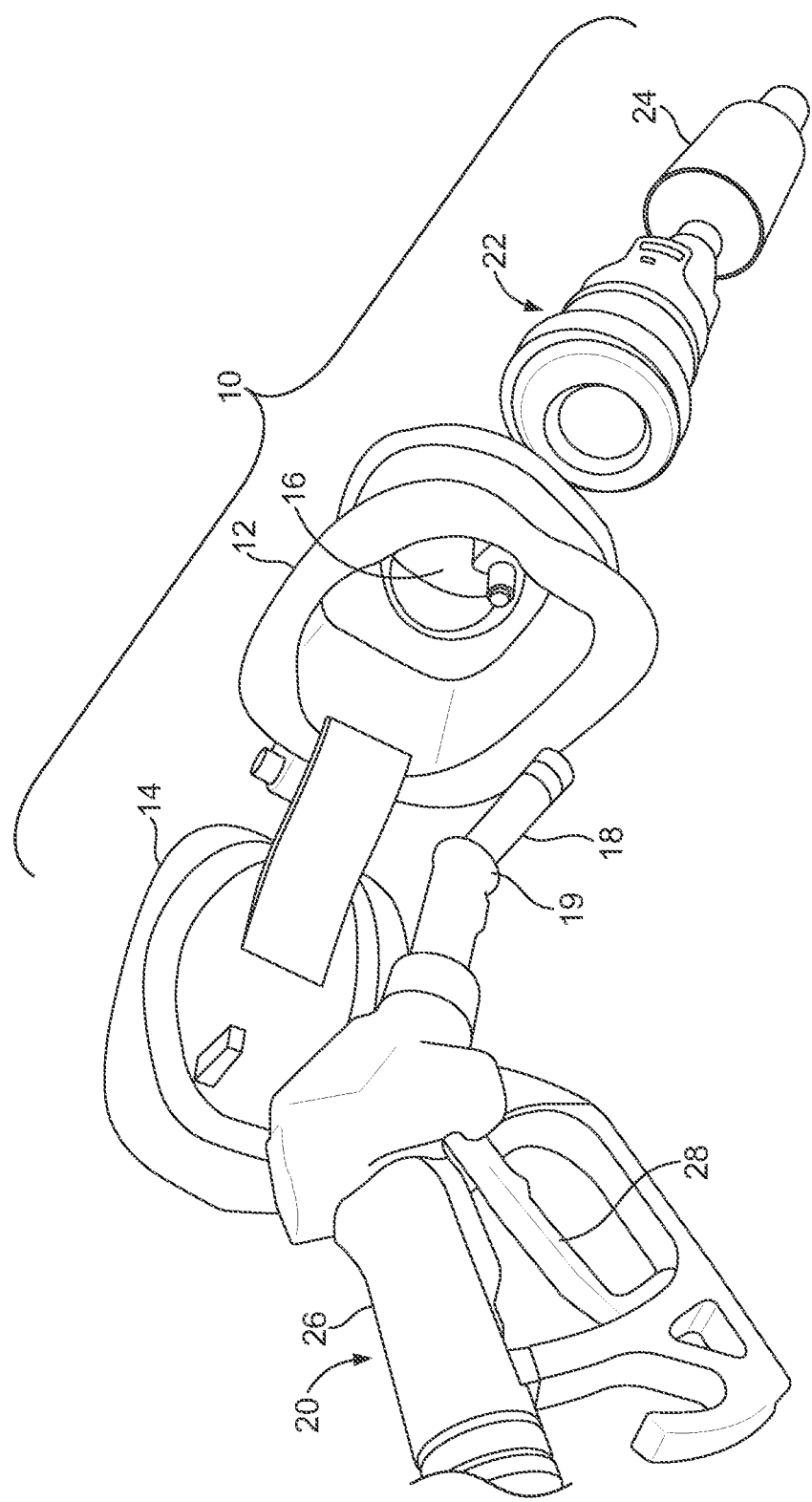
FIG. 1 illustrates a perspective view of a fuel intake system, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

FIG. 1 illustrates a perspective view of a fuel intake system 10, according to an embodiment of the present disclosure. The fuel intake system 10 may include a nozzle-receiving housing 12, which may be secured to a frame of a vehicle, for example. The nozzle-receiving housing 12 may include a door 14 that pivotally connects to the housing 12. The door 14 is configured to be pivoted between open and closed positions. The housing 12 defines an opening 16 into which a nozzle 18 of a fuel-dispensing device 20 may be inserted.

The housing 12 may directly or indirectly connect to an improper fuel nozzle insertion-inhibiting assembly, such as a mis-fuel inhibitor (MFI) assembly 22. The MFI assembly 22 is configured to prevent improper fuel-dispensing devices (for example, fuel-dispensing devices that are incompatible with the fuel intake system 10) from dispensing fuel into a fuel fill pipe 24 connected to the MFI assembly 22. For example, the MR assembly 22 prevents a diesel fuel-dispensing device from being inserted into a gasoline fuel intake system, or vice versa. That is, a diesel fuel-dispensing device is an improper or incompatible fuel-dispensing device in relation to a gasoline fuel intake system, while a gasoline fuel-dispensing device is an improper or incompatible fuel-dispensing device in relation to a diesel fuel intake system.

The fuel-dispensing device 20 includes a handle 26 operatively connected to a trigger 28. The handle 28 is configured to be grasped by an operator and connects to the nozzle 18.

Figure 2:
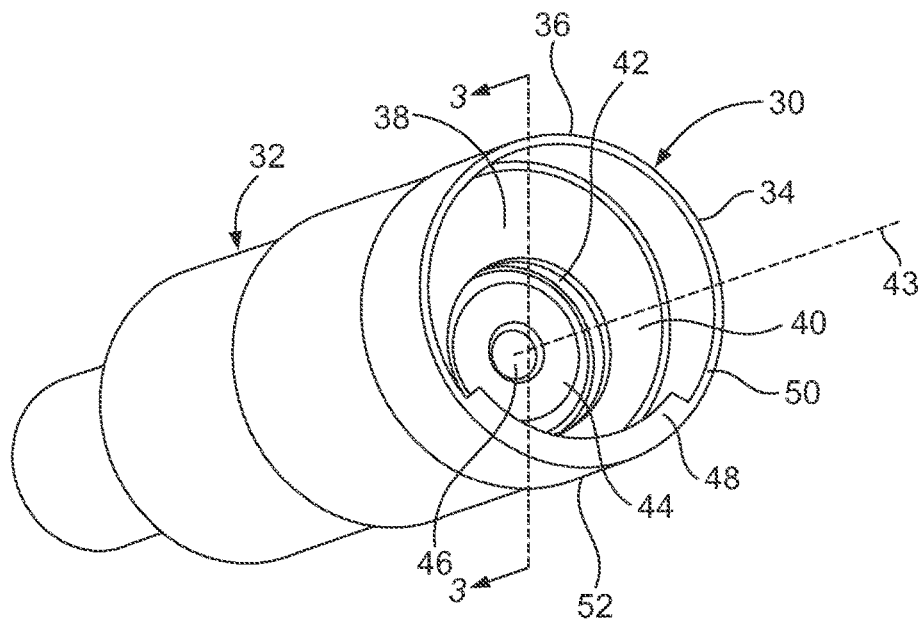
FIG. 2 illustrates a perspective front view of a mis-fuel inhibitor (MFI) assembly secured to a fuel fill pipe, according to an embodiment of the present disclosure.

FIG. 2 illustrates a perspective front view of a mis-fuel inhibitor (MFI) assembly 30 secured to a fuel fill pipe 32, according to an embodiment of the present disclosure. The MFI assembly 30 includes a cover 34 having a circumferential wall 36. The circumferential wall 36 may be circular in cross-section and connects to a front face wall 38 that may be generally perpendicular to the circumferential wall 36. For example, the front face wall 38 may form a base from which the circumferential wall 36 outwardly extends. An open nozzle-receiving cavity 40 is defined between the circumferential wall 36 and the front face wall 38. A channel 42 is formed through the front face wall 38. The channel 42 provides an inlet for a nozzle-receiving passage that extends through an internal chamber of the MR assembly 30. A nozzle inlet barrier door 44 is pivotally secured within the channel 42. A pressure-relief valve 46 may be secured within the nozzle inlet barrier door 44. Alternatively, the pressure-relief valve 46 may not be secured to the nozzle inlet barrier door 44. Instead, the nozzle inlet barrier door 44 may simply include a contiguous covering panel.

An arcuate nozzle-latching member 48, such as a ridge, rim, lip, or the like, may inwardly and radially extend from the circumferential wall 36 toward a central longitudinal axis 43 of the MFI assembly 30. The nozzle-latching member 48 may inwardly extend from a front edge 50 of the circumferential wall 36 and may generally conform to the curvature of the circumferential wall 36. The nozzle-latching member 48 may extend inwardly from a bottom 52 of the circumferential wall 36 over a radial angle of approximately 45°. Alternatively, the nozzle-latching member 48 may extend over distances that are greater or less than a radial angle of 45°. For example, the nozzle-latching member 48 may extend around an entire internal diameter of the circumferential wall 36. Additionally, the nozzle-latching member 48 may optionally be positioned further toward the front face wall 38, instead of the front edge 50. As shown in FIG. 2, however, the nozzle-latching member 48 is within the cavity 40 outside of the nozzle inlet bather door 44.

Figure 3:
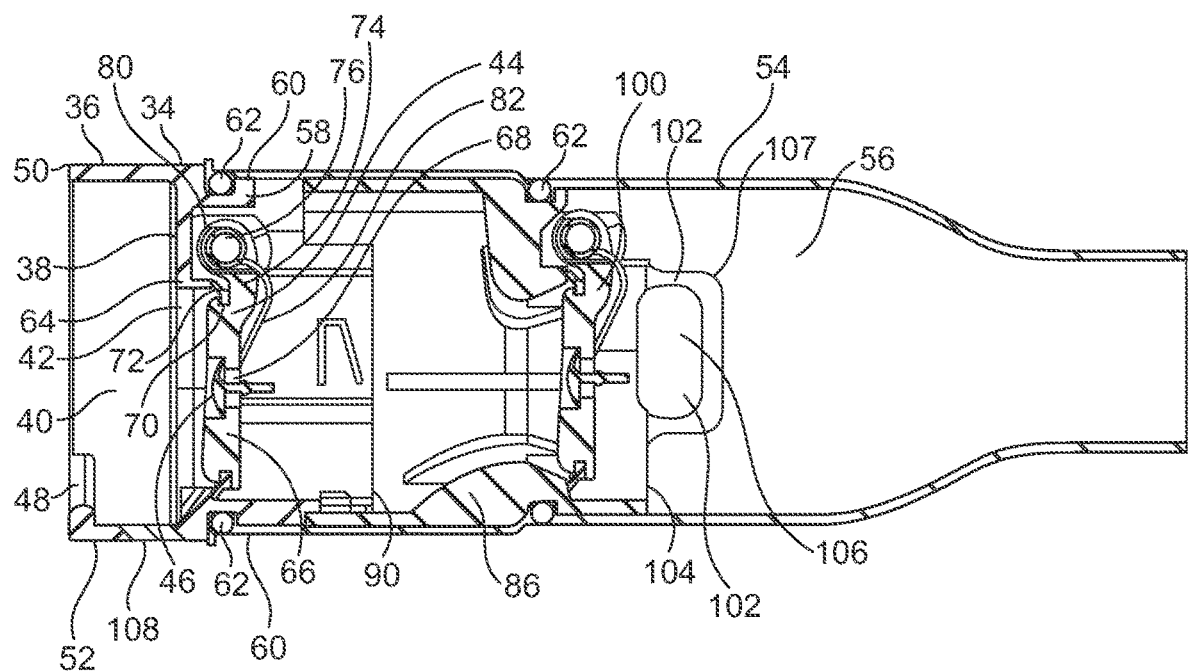
FIG. 3 illustrates an internal cross-sectional view of an MFI assembly secured to a fuel fill pipe through line 3-3 of FIG. 2, according to an embodiment of the present disclosure.

FIG. 3 illustrates an internal cross-sectional view of the MFI assembly 30 secured to the fuel fill pipe 32 through line 3-3 of FIG. 2, according to an embodiment of the present disclosure. The fuel fill pipe 32 includes an inlet pipe 54 defining an internal channel 56 that connects to a fuel tank (not shown).

The circumferential wall 36 of the MFI assembly 30 connects to a main body 58 that is secured within the internal channel 56 of the inlet pipe 54. For example, the main body 58 may have an outer diameter that is less than that of the internal channel 56 of the inlet pipe 54, while the diameter of the circumferential wall 36 is greater than the diameter of the internal channel 56. As such, the main body 58 may be slid into the internal channel 56 until the circumferential wall 36 abuts against the inlet pipe 54. The main body 58 may securely connect to the inlet pipe 54 through an interference fit, for example.

The main body 58 may include a ledge 60 connected to the circumferential wall 36. The ledge 60 may retain a sealing member 62, such as an elastomeric gasket, O-ring, or the like, that provides a seal between the main body 58 and the inlet pipe 54.

As noted above, the nozzle inlet barrier door 44 is pivotally secured within the channel 42. The channel 42 is defined by an inwardly-directed tubular wall 64 that is generally perpendicular to the front face wall 38 and parallel with the circumferential wall 36.

The nozzle inlet bather door 44 includes a covering panel 66 having a valve-retaining opening 68 formed therein. The valve-retaining opening 68 retains the pressure relief valve 46. When internal pressure exceeds a particular pre-defined threshold, the pressure-relief valve 46 may be forced open in relation to the valve-retaining opening 68, to allow fluid pressure to be released through the valve-retaining opening 68. When the pressure drops below the pre-defined threshold, the pressure relief valve 46 re-seats on the covering panel 66, thereby closing the valve-retaining opening 68.

The covering panel 66 includes a circumferential slot 70 that retains a radial seal 72 that outwardly and radially extends from the covering panel 66. In the closed position, the radial seal 72 sealingly engages the wall 64, thereby preventing fluid and debris, such as dust, from passing into an internal chamber 90 of the MR assembly 30. Alternatively, instead of, or in addition to, the radial seal extending from the covering panel 66, a seal may radially extend inwardly from the wall 64 of the main body 58.

The nozzle inlet barrier door 44 also includes a hinge 74 that extends rearwardly from the covering panel 66. The hinge 74 includes integrally formed posts 76 that extend outwardly from an upper portion of the hinge 74. The posts 76 may define a pivot axle. For example, two opposed posts 76 may extend from an upper portion of the hinge 74. The posts 76 are pivotally secured within reciprocal post-receiving channels 80 of an axle bearing formed in the main body 58 behind the front face wall 38. As such, the nozzle inlet barrier door 44 pivotally connects to the main body 58 of the cover 34 without the use of separate and distinct pins, for example. In systems with pins, the additional component of the pin adds size. As such systems with pins are typically larger and bulkier than embodiments of the present disclosure. Further, the process of forming through-holes to accommodate and retain the pins, as well as ultrasonic welding of the holes, is labor and time-intensive, and therefore costly. Embodiments of the present disclosure provide assemblies that eliminate or otherwise reduce such costs.

One or more torsion springs 82 may be operatively connected to the hinge 74 and a rear surface of the covering panel 66. The torsion spring(s) 82 ensure that the nozzle inlet barrier door 44 remains in a closed position. The torsion spring(s) 82 resist force that tends to pivot the nozzle inlet barrier door 44 into an open position, such as a vacuum force produced within a fuel tank. Alternatively, the MR assembly 30 may not include the torsion spring(s) 82. Instead, the nozzle inlet barrier door 44 may exert sufficient resistive force to ensure that the nozzle inlet barrier door 44 remains closed.

The main body 58 may also include internal restricting members 86 downstream (in relation to a location where a fuel nozzle is inserted and urged into the MFI assembly 30) from the nozzle inlet bather door 44. The restricting members 86 may be inwardly directed ribs, fins, panels, or the like that effectively reduce the internal diameter of an internal chamber 90 of the MFI assembly 30. For example, a diameter of a nozzle passage area within the internal chamber 90 proximate to the nozzle inlet barrier door 44 is greater than a diameter of a nozzle passage area within the internal chamber 90 proximate to a nozzle outlet barrier door 100. Thus, while a nozzle having a particular diameter may be able to pass into the internal chamber 90 through the nozzle inlet barrier door 44, the nozzle may have a diameter that is too large to pass between the restricting members 86. As such, the nozzle may be unable to abut against a front surface of the nozzle outlet barrier door 100.

The nozzle outlet barrier door 100 may be configured similar to the nozzle inlet barrier door 44. The nozzle outlet barrier door 100 may be pivotally secured to the main body 58 downstream from the restricting member 86.

The main body 58 may also include one or more snap rims 102 that extend longitudinally outward from a trailing edge 104 of the main body 58. Each snap rim 102 is configured to snapably engage a reciprocal latch 106 (such as a protuberance that conforms to a shape of an internal opening 107 formed within the snap rim 102) of the fuel fill pipe 32 that inwardly protrudes into the internal channel 56. In this manner, the snap rim(s) 102 securely connect the MFI assembly 30 to the fuel fill pipe 32.

As shown, an additional sealing member 62 may sealingly connect the main body 58 to the inlet pipe 54 proximate to the nozzle outlet barrier door 100. Alternatively, the MFI assembly 30 may include more or less sealing members 62 than shown.

The MFI assembly 30 may also include a drain 108 formed through the bottom 52 of the circumferential wall 36. The drain 108 may be an open-ended passage that allows fluid that collects within the open cavity 40 to drain out of the MFI assembly 30.

Figure 4:
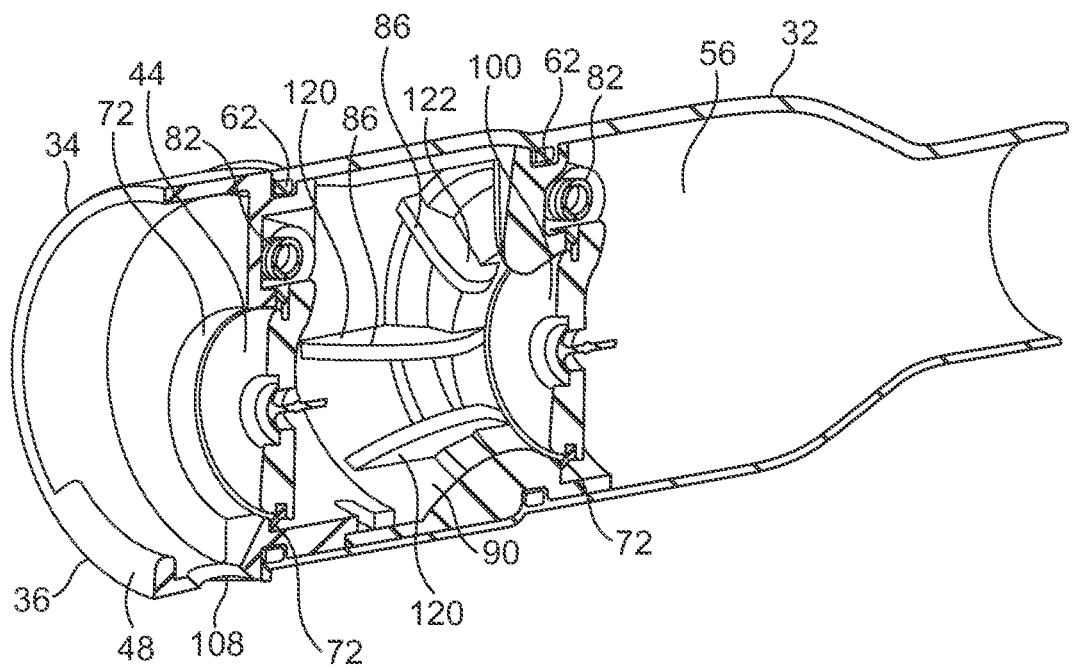
FIG. 4 illustrates a perspective internal cross-sectional view of an MFI assembly secured to a fuel fill pipe through line 3-3 of FIG. 2, according to an embodiment of the present disclosure.

FIG. 4 illustrates a perspective internal cross-sectional view of the MFI assembly 30 secured to the fuel fill pipe 32 through line 3-3 of FIG. 2, according to an embodiment of the present disclosure. As shown, the restricting members 86 include leading or upstream edges 120 that are shorter than trailing or downstream edges 122. The height of each restricting member 86 may progressively increase from the leading edge 120 to the trailing edge 122. The height of the trailing edges 122 may be great enough to prevent an improper or incompatible fuel nozzle from engaging the nozzle outlet barrier door 100. For example, an opening between multiple trailing edges 122 may have a diameter that is smaller than a diameter of the improper or incompatible fuel nozzle, thereby preventing the improper fuel nozzle from passing therethrough. Further, because the height of the restricting members 86 progressively increases from the leading edges 120 to the trailing edges 122, the restricting members 86 provide lead-in members that align and guide a proper or compatible fuel nozzle into the nozzle outlet barrier door 100.

As shown in FIG. 4, the nozzle-latching member 48 is outside of the internal chamber 90 and is upstream from the nozzle inlet barrier door 44. The nozzle-latching member 48 is configured to allow a fuel nozzle to latch thereto in order to secure the fuel nozzle into the MFI assembly 30 during a refueling process. Unlike known assemblies, the nozzle-latching member 48 is not positioned between the doors 44 and 100. It has been found that locating the nozzle-latching member 48 with respect to the circumferential wall 36 outside of the internal chamber 90 provides a more stable secure connection between the fuel nozzle and the MFI assembly 30. By positioning the nozzle-latching member 48 outside of the internal chamber 90 and sealing surfaces, and separating the nozzle-latching member 48 from the barrier doors 44 and 100, it has also been found that the overall size of the MFI assembly 30 may be reduced, as compared to known MFIs.

The seal members 62 and the radial seals 72 prevent fluid and debris, such as dust, from passing into the MFI assembly 30. Thus, when the doors 44 and 100 are closed, the radial seals 72 prevent fluid and debris from passing into the internal chamber 90 of the MFI assembly 30 and the internal channel 56 of the fuel fill pipe 32.

The torsion springs 82 that may be operatively connected to the doors 44 and 100 resist vacuum pressure that would otherwise tend to open the doors 44 and 100. As such, the torsion springs 82 ensure that the doors 44 and 100 do not inadvertently or undesirably open.

The cover 34 and the nozzle inlet bather door 44 may be formed of a conductive material, such as a conductive nylon, plastic, or the like. Therefore, the cover 34 and the nozzle inlet barrier door 44 may provide a grounding path to the fuel fill pipe 32. As a fuel nozzle contacts the cover 34 and/or the nozzle inlet barrier door 44, any electrical discharge is shunted to the fuel fill pipe 32 and to ground by way of the cover 34. For example, a fuel nozzle may contact the nozzle inlet barrier door 44, which, in turn, is pivoted upwardly into the cover 34, which may also be formed of a similar conductive material. The cover 34 connects to the fuel pipe, such as through longitudinal ribs 180 (shown in FIG. 7), thereby providing a path to ground.

Figure 5:
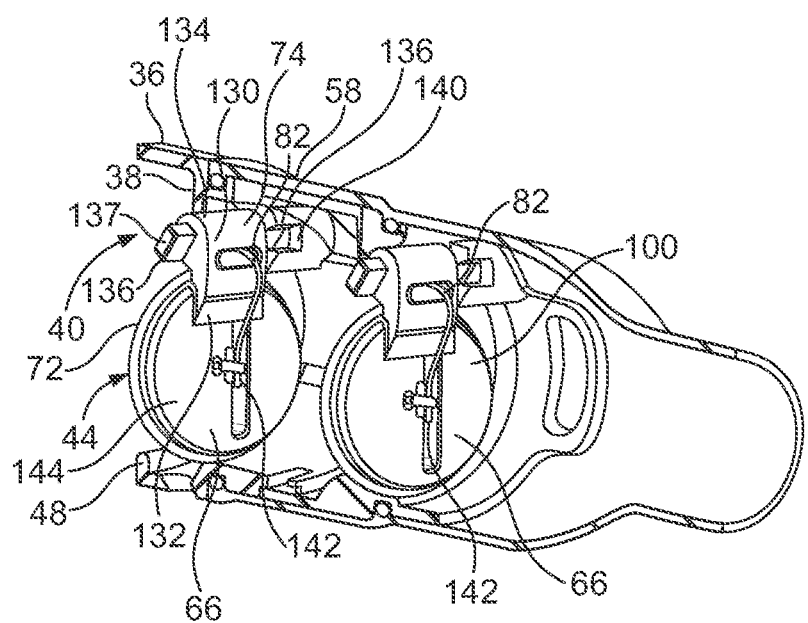
FIG. 5 illustrates a perspective rear view of nozzle inlet and outlet barrier doors pivotally secured within an MFI assembly, according to an embodiment of the present disclosure.

FIG. 5 illustrates a perspective rear view of nozzle inlet and outlet barrier doors 44 and 100, respectively, pivotally secured within the MFI assembly 30, according to an embodiment of the present disclosure. As shown, the hinge 74 rearwardly and upwardly extends from a top portion of the covering panel 66. The hinge 74 includes a curved main beam 130 having a lower end 132 extending rearwardly and upwardly from a top portion of the covering panel 66. An upper end 134 of the main beam 130 may be rounded in order to reduce the risk of snagging or catching on portions of the main body 58 during pivotal movement. Opposed posts 136 outwardly extend from either side of the upper end 134 of the main beam 130, thereby forming a pivot axle 137. As shown, the main beam 130 and the pivot axle 137 may form a T-shape.

In order to install the barrier doors 44 and 100 to the main body 58, each post 136 is configured to slide into an open passage 140 of the main body 58 at an installation angle, and rotatably seat into a pivot chamber connected to the open passage 140. Thus, in order to securely connect each barrier door 44 and 100 to the main body 58, the posts 136 are aligned with reciprocal passages 140 and urged therein. The barrier doors 44 and 100 are then manipulated so that the posts 136 are positioned within pivot or axle chambers or bearings connected to the passages 140.

As also shown in FIG. 5, the torsion springs 82 may extend outwardly and rearwardly from the main beam 130. Each torsion spring 82 includes a distal end 142 that is biased into a rear surface 144 of the covering panel 66. As such, the torsion springs 82 exert resistive forces into the rear surfaces 144 that tend to maintain the barrier doors 44 and 100 in closed positions.

Figure 6:
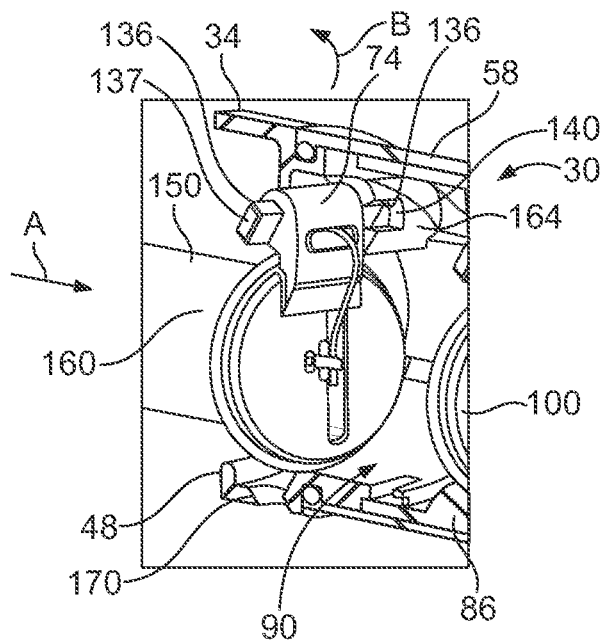
FIG. 6 illustrates a perspective rear internal view of a nozzle inlet bather door being engaged by a fuel nozzle, according to an embodiment of the present disclosure.

FIG. 6 illustrates a perspective rear view of the nozzle inlet barrier door 44 being engaged by a fuel nozzle 150, according to an embodiment of the present disclosure. As a distal end 160 of the fuel nozzle 150 is urged into the nozzle inlet barrier door 44 in the direction of arrow A, if the fuel nozzle 150 is sized to fit within the MFI assembly 30, the distal end 160 forces the nozzle inlet barrier door 44 to open by way of the pivot axle 137 pivoting within the axle bearings 164 of the main body 58. The axle bearings 164 include the open passages 140 that lead to pivot chambers in which the posts 136 are pivotally retained.

As the movement of the fuel nozzle 150 pivots the nozzle inlet barrier door 44 open in the direction of arc B, the fuel nozzle 150 may pass into the internal chamber 90 of the MFI assembly 30. The pivotal movement of the nozzle inlet barrier door 44 is limited by the hinge 74 abutting against an interior surface of the cover 34. For example, the outward and rearward bow of the hinge 74 provides a stop that abuts against an interior surface of the cover 34, thereby halting further movement in the direction of arc B. The hinge 74 may be sized and shaped so that, after the barrier door 44 is installed to the axle bearings 164, the hinge 74 abuts a portion of the cover 34 before reaching the installation angle, which would otherwise provide a path for the posts 136 to be removed from the open passages 140. As such, once installed, the hinge 74 may provide a stop that prevents the hinge 74 and the posts 136 from moving back into the installation angle, thereby preventing the posts 136 from disengaging from the axle bearings 164. In general, the hinge 74 is sized and shaped to limit movement of the barrier door 44 to ensure that the posts 136 remain pivotally secured within the axle bearings 164 and do not retreat out of the open passages 140. The axle 137 swings open in the direction of arc B (with the entire barrier door 44 following such movement) and may engage inner surfaces of the axle bearing 164 and/or internal surfaces of the cover 34, thereby ensuring that the barrier door 44 remains pivotally secured to the axle bearing 164. The nozzle outlet barrier door 100 is configured to move in a similar fashion.

As the fuel nozzle 150 passes into the internal chamber 90, if the diameter of the fuel nozzle 150 is sized to fit past the restricting members 86, the fuel nozzle 150 may be urged into, and open, the nozzle outlet barrier door 100 similar to as described above. If, however, the fuel nozzle 150 is too large to fit past the restricting member(s) 86, the fuel nozzle 150 is unable to engage the nozzle outlet barrier door 100.

Once a proper sized fuel nozzle 150 is inserted through the MFI assembly 30, the fuel nozzle 150 may dispense fuel into the fuel fill pipe 32 (not shown in FIG. 6). An outer radial ridge 19 (shown in FIG. 1) of the fuel nozzle 150 may abut against an inner surface 170 of the nozzle-latching ledge 48, thereby securely propping and positioning the fuel nozzle 150 with respect to the MFI assembly 30.

Figure 7:
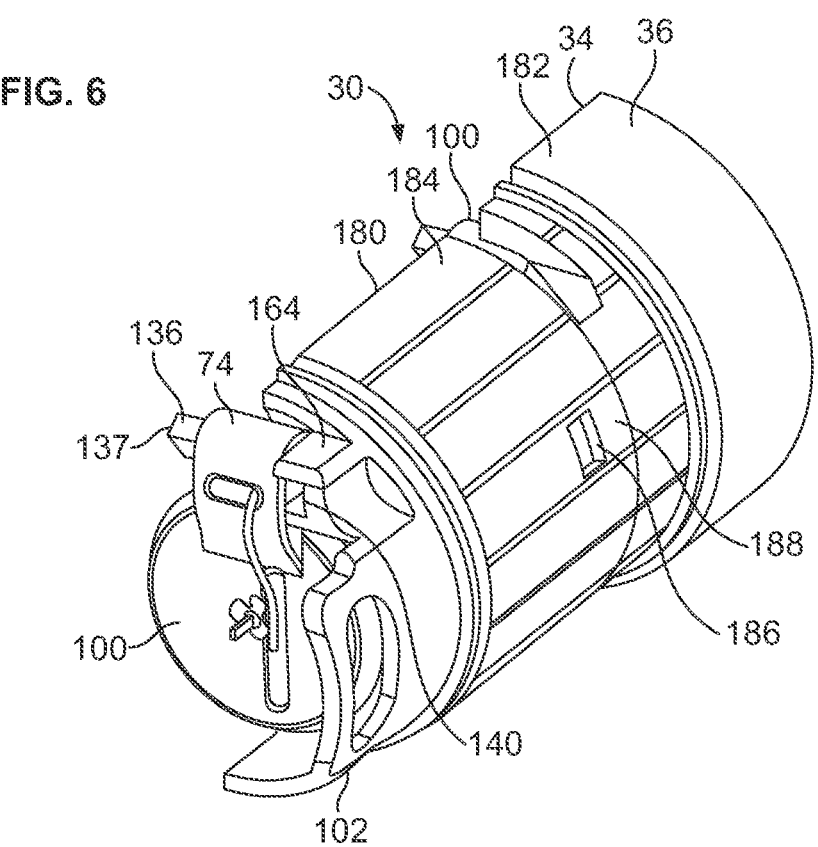
FIG. 7 illustrates a perspective rear view of an MR assembly, according to an embodiment of the present disclosure.

FIG. 7 illustrates a perspective rear view of the MFI assembly 30, according to an embodiment of the present disclosure. An outer surface of the cover 34 may include longitudinal ribs 180 that are configured to directly contact interior surfaces of the fuel fill pipe 32 (not shown in FIG. 7). The ribs 180 provide strength to the cover 34 and prevent the cover 34 from inwardly bowing or collapsing when the cover 34 is inserted into the fuel fill pipe 32. Further, because the ribs 180 directly contact the fuel fill pipe 32, which is grounded, a path to ground is established between the ribs 180 and the fuel fill pipe 32.

As shown, the cover 34 may be formed of first and second halves 182 and 184. For example, the first and second halves 182 and 184 may be snap fit together, such as through snap tabs 186 being snapably secured into reciprocal slots 188. Alternatively, the cover 34 may be formed as a single unitary piece. For example, the cover 34 may be an integrally formed and molded piece of plastic.

Also, each bather door 44 and 100 may include the covering panel 66 integrally formed and molded with the hinge 74 and axle 137 defined by the posts 136. For example, a single mold may form each bather door 44 and 100 through a process of injection molding.

Figure 8:
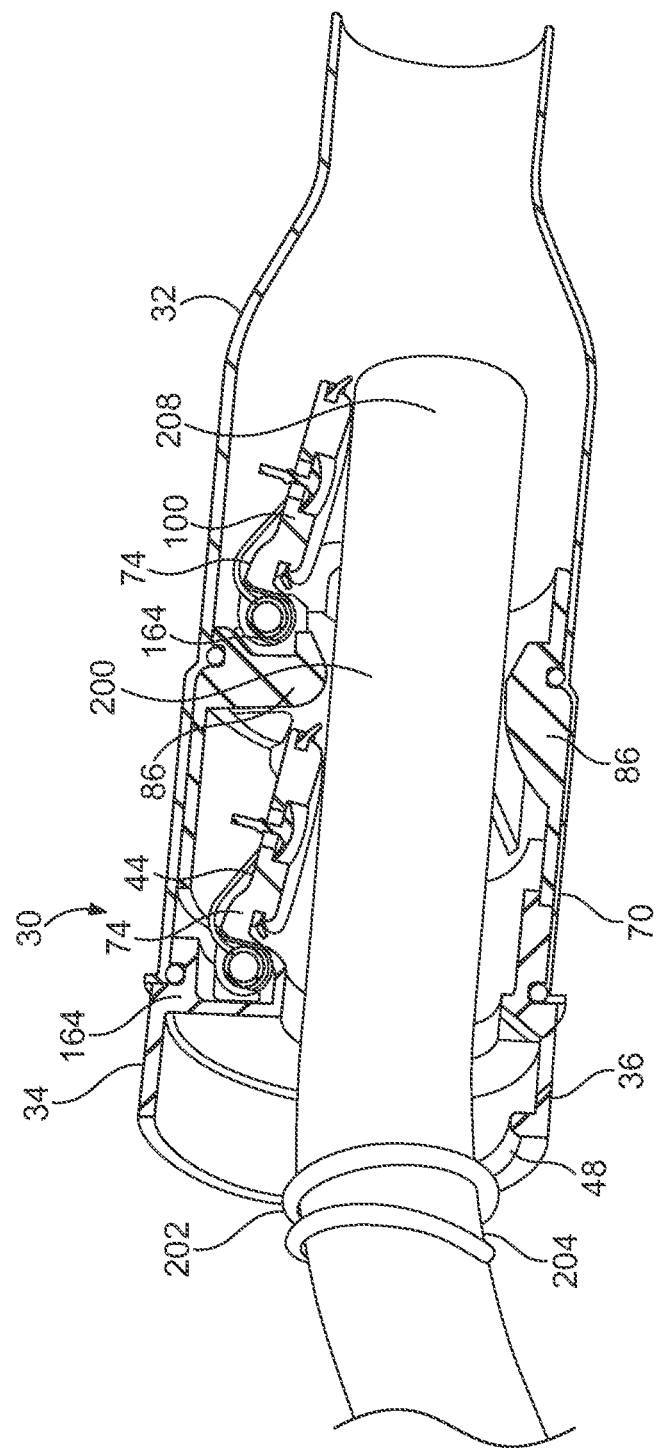
FIG. 8 illustrates a perspective internal view of a fuel nozzle positioned within an MFI assembly, according to an embodiment of the present disclosure.

FIG. 8 illustrates a perspective internal view of a fuel nozzle 200 positioned within the MFI assembly 30, according to an embodiment of the present disclosure. The fuel nozzle 200 may include circumferential outer rims 202 and 204 that are configured to engage the nozzle-latching member 48 so that the fuel nozzle 200 may be securely propped on, and in, the MFI assembly 30. As shown, a distal end 208 of the fuel nozzle 200 has passed through the internal chamber 90, such that both bather doors 44 and 100 are forced open. Rear surfaces of the hinges 74 abut against internal surfaces of the cover 34, thereby ensuring that the barrier doors 44 and 100 do not eject from pivotal engagement with the axle bearings 164. The fuel nozzle 200 is small enough to fit between the restricting members 86.

Embodiments of the present disclosure shown and described with respect to FIGS. 1-8 may be used with various vehicles. For example, the MFI assembly 30 may be used with vehicles that are fueled with gasoline or diesel.

Figure 9:
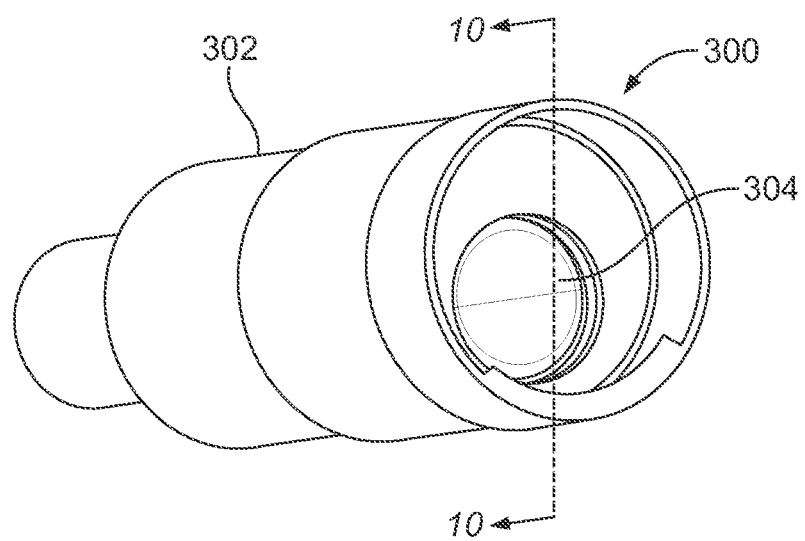
FIG. 9 illustrates a perspective front view of an MR assembly secured to a fuel fill pipe, according to an embodiment of the present disclosure.

FIG. 9 illustrates a perspective front view of an MFI assembly 300 secured to a fuel fill pipe 302, according to an embodiment of the present disclosure. The MFI assembly 300 is similar to the MFI assembly 30. However, the MR assembly 300 includes a nozzle inlet barrier door 304 that may not include a pressure-relief valve.

Figure 10:
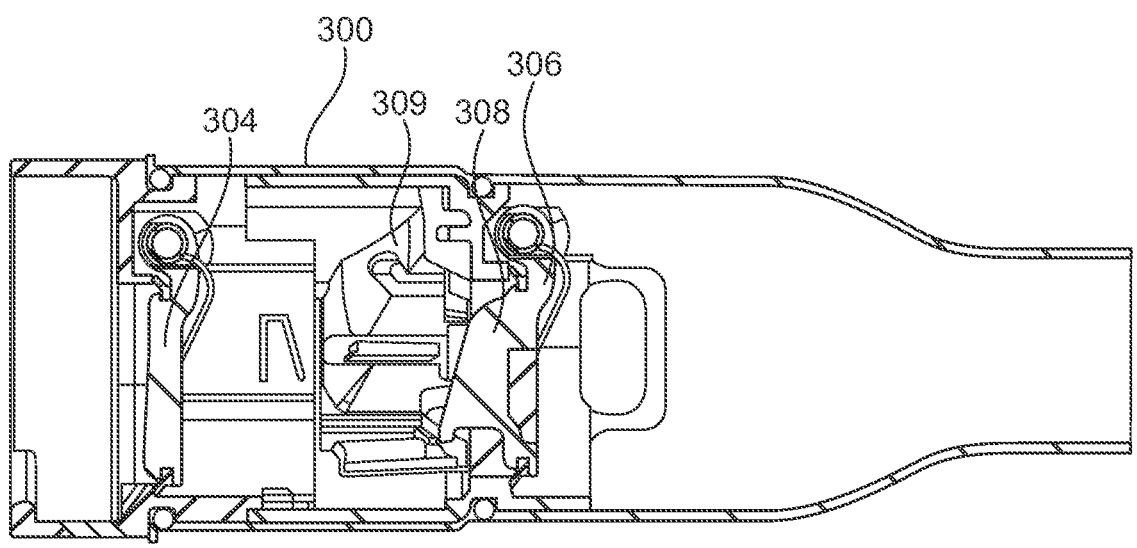
FIG. 10 illustrates an internal cross-sectional view of an MFI assembly secured to a fuel fill pipe through line 10-10 of FIG. 9, according to an embodiment of the present disclosure.

FIG. 10 illustrates an internal cross-sectional view of the MFI assembly 300 secured to the fuel fill pipe 302 through line 10-10 of FIG. 9, according to an embodiment of the present disclosure. As shown, a nozzle outlet barrier door 306 may be sized and shaped differently than the nozzle inlet barrier door 304. The nozzle outlet bather door 306 may include a covering body 308 that may be sized and shaped to be opened by a specific type of fuel nozzle. For example, an improper fuel nozzle may lock onto a feature, such as an opening, barb, clasp, or the like, of the barrier door 306, thereby preventing the barrier door 306 from being pivoted into an open position. A proper fuel nozzle does not lock onto the barrier door 306, thereby allowing the fuel nozzle to pivot the barrier door 306 into an open position. Alternatively, the nozzle inlet barrier door 304 may also include a covering body that is configured to lock onto an improper fuel nozzle, thereby preventing the door 304 from being opened.

As shown in FIG. 10, the MFI assembly 300 may also include a restricting member 309 in the form of a conical or funneling tube, insert, or the like, for example. Thus, instead of fins, ribs, or the like, the restricting member 309 may funnel down in order to prevent an improper fuel nozzle from passing therethrough.

Figure 11:
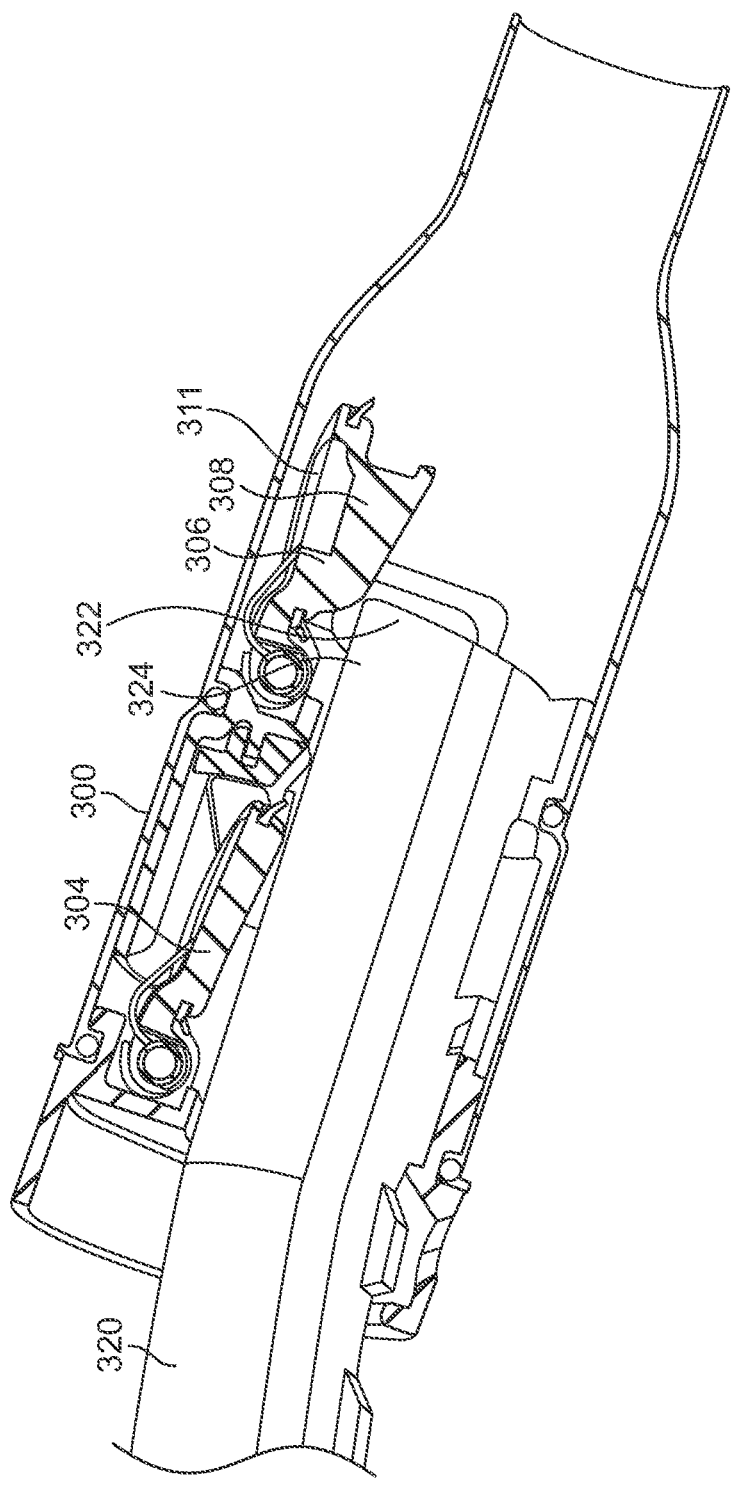
FIG. 11 illustrates a perspective internal view of a fuel nozzle positioned within an MFI assembly, according to an embodiment of the present disclosure.

FIG. 11 illustrates a perspective internal view of a fuel nozzle 320 positioned within the MFI assembly 300, according to an embodiment of the present disclosure. The fuel nozzle 320 includes an angled tip 322 that may be unable to latch onto the covering body 308. For example, the angle of the tip 322 angles away from the covering body 308, leaving an upper edge 324 to engage an upper portion of the covering body 308, thereby pivoting the bather door 306 open. However, an improper fuel nozzle may not include such an angled tip, and may abut directly into the covering body 308, which may include latching features that latch onto the fuel nozzle, thereby preventing the bather door 306 from being opened.

As another example, the covering body 308 may include a central opening 311 that is sized and shaped to fit around an improper fuel nozzle. For example, an improper fuel nozzle that is small enough to fit past the restricting member 309 may be received within the central opening 311. Because the fuel nozzle fits within the central opening 311, any further movement of the fuel nozzle into the MR assembly 300 is halted, due to the fuel nozzle being lodged within the central opening 311. The improper nozzle may simply be removed from the central opening in a removal direction that is opposite from an insertion direction. As the improper nozzle is pulled in the removal direction, the distal tip of the improper nozzle may slide out of the central opening.

Alternatively, any of the embodiments of the present disclosure described above may include a locking door 404 at an inlet of an MFI assembly, for example. The locking door may be moveably secured to an inlet tube of the MFI assembly.

Referring to FIGS. 1-11, embodiments of the present disclosure provide MFI assemblies that are configured to prevent improper fuel nozzles from dispensing fuel into a fuel fill pipe. The MFI assemblies may include one or more barrier doors that pivotally secure to covers of the MFI assemblies through integral features, as opposed to separate and distinct pins.

Embodiments of the present disclosure provide bather doors, such as any of those described above, that are pivotally secured to a cover of an MFI assembly without the use of separate and distinct pins, fasteners, or the like. As such, through-holes do not need to be formed through the cover in order to accommodate and secure a pin or fastener. Because there may not be any through-holes for pins, there may not be a need for any type of ultrasonic welding or a separate flap bracket component, as with previously-known MFIs.

Various known MFIs require ultrasonic welding of separate pieces in order to provide a bearing surface for a pin axle without creating a leak path for fuel vapor. Embodiments of the present disclosure do not require separate and distinct pins or through-holes.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fuel nozzle receptacle, comprising:
   a cover;
   a main body partially disposed in the cover and including a slotted axle bearing; and
   a barrier door pivotably engaged with the main body and including
      a post rotatably disposed in the slotted axle bearing, the post being oblong in cross section and non-circular in cross section, and
      a hinge connected to the post and shaped to abut the cover when the barrier door is in an open position relative to the main body to stop the post from slidably escaping the slotted axle bearing.

2. The fuel nozzle receptacle of claim 1, wherein the main body includes an internal restricting member.

3. The fuel nozzle receptacle of claim 1, wherein the main body includes a snap rim configured to snapably engage with a latch of a fuel fill pipe.

4. The fuel nozzle receptacle of claim 1, further comprising a spring engaged with the main body and the barrier door to urge the barrier door toward a closed position relative to the main body.

5. The fuel nozzle receptacle of claim 1, wherein the cover includes a plurality of external ribs configured to contact an interior surface of a fuel fill pipe.

6. The fuel nozzle receptacle of claim 1, wherein the barrier door includes a relief valve.

7. The fuel nozzle receptacle of claim 1, wherein the barrier door abuts the cover when the barrier door is in a closed position relative the main body.

8. The fuel nozzle receptacle of claim 1, wherein the post slides relative to the slotted axle bearing when the barrier door is in an installation position relative the main body.

9. An error-inhibiting fuel filler, comprising:
   a main body including a slotted axle bearing, the slotted axle bearing defining a cavity and a passage in communication with one another; and
   a barrier door pivotably engaged with the main body and including a post rotatably disposed in the cavity, the post being oblong in cross section and non-circular in cross section, the post having a long dimension and a short dimension, the short dimension being misaligned with the passage to slidingly secure the post in the slotted axle bearing when the barrier door is between closed and open positions relative to the main body, inclusive.

10. The error-inhibiting fuel filler of claim 9, wherein the main body includes an internal restricting member.

11. The error-inhibiting fuel filler of claim 10, wherein:
    the main body has an upstream end and a downstream end,
    the internal restricting member is between the upstream end and the downstream end, and
    the barrier door is at the downstream end.

12. The error-inhibiting fuel filler of claim 9, wherein the main body includes a snap rim configured to snapably engage with a latch of a fuel fill pipe.

13. The error-inhibiting fuel filler of claim 9, further comprising a spring engaged with the main body and the barrier door to urge the barrier door toward the closed position.

14. The error-inhibiting fuel filler of claim 9, wherein:
    the main body defines an internal chamber, and
    the axle bearing extends inwardly into the internal chamber.

15. The error-inhibiting fuel filler of claim 9, wherein the post is rectilinear.

16. The error-inhibiting fuel filler of claim 9, wherein the post is slidable relative to the slotted axle bearing via the passage when the barrier door is in an installation position relative to the main body.

17. An error-inhibiting fluid receptacle, comprising:
    a cover;
    a main body partially disposed in the cover; and
    a barrier door including
       a non-circular post
          pivotably engaged and slidingly fixed with the main body when the barrier door is in a closed position relative to the main body, and
          slidable relative to the main body when the barrier door is at an installation angle relative to the main body, and
       a hinge connected to the non-circular post, the hinge being shaped to abut the cover before the barrier door reaches the installation angle.

18. The error-inhibiting fluid receptacle of claim 17, wherein:
    the barrier door is a first barrier door,
    the non-circular post is a first non-circular post, and
    the hinge is a first hinge and further comprising:
    a second barrier door including
       a second non-circular post
          pivotably engaged and slidingly fixed with the main body when the second barrier door is in a second closed position relative to the main body, and
          slidable relative to the main body when the second barrier door is at a second installation angle relative to the main body, and a second hinge connected to the second non-circular post, the second hinge being shaped to abut the cover before the second barrier door reaches the second installation angle.

19. The error-inhibiting fluid receptacle of claim 18, wherein the main body includes an internal restricting member between the first barrier door and the second barrier door.

20. The error-inhibiting fluid receptacle of claim 17, wherein:
- the barrier door is pivotable between the closed position and an open position,
- the hinge abuts the cover at the open position, and
- the open position is between the closed position and the installation angle.

* * * * *